(No Model.)

I. V. HICKS.
DRILL CHUCK.

No. 318,986. Patented June 2, 1885.

Witnesses.
John C. Perkins
John P. Oggel

Inventor.
Ira V. Hicks
By James W. Osborn
Att'y

UNITED STATES PATENT OFFICE.

IRA V. HICKS, OF KALAMAZOO, MICHIGAN.

DRILL-CHUCK.

SPECIFICATION forming part of Letters Patent No. 318,986, dated June 2, 1885.

Application filed March 27, 1885. (No model.)

*To all whom it may concern:*

Be it known that I, IRA V. HICKS, a citizen of the United States, residing at Kalamazoo, in the county of Kalamazoo and State of Michigan, have invented certain new and useful Improvements in Drilling Devices, of which the following is a description.

My invention relates to certain improvements in drilling devices; and the objects thereof are, first, to afford a simple, cheap, and effective device for adjustably adapting the drill to the varying thicknesses of metal and kinds and conditions of work to be done; second, to provide means for preventing the vibrations of the drill, causing inaccuracy of work and frequent breakage of the drill. Heretofore the drill has been grasped or held in a socket by its extreme end, leaving nearly its entire length unsupported, in consequence whereof vibration and great strain often ensue, resulting in imperfect work and frequent injury to or destruction of the drill. I overcome these serious difficulties by the use of an adjustable sleeve adapted to receive the drill as within a sheath, where it is firmly held in a vise-like grasp, leaving only that portion exposed and unsupported that is needed for performing the work in hand for the time being.

Figure 1:
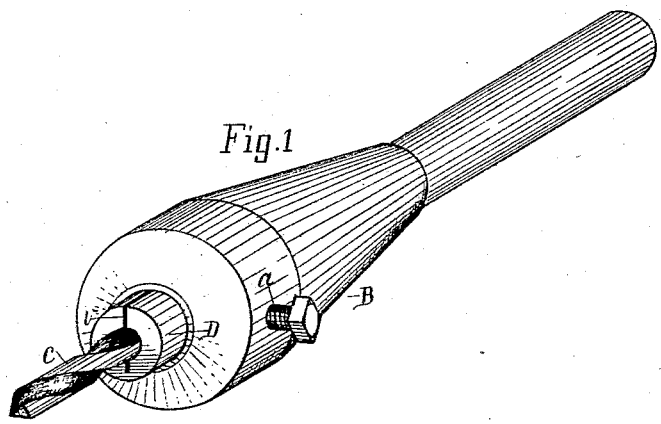
Figure 2:
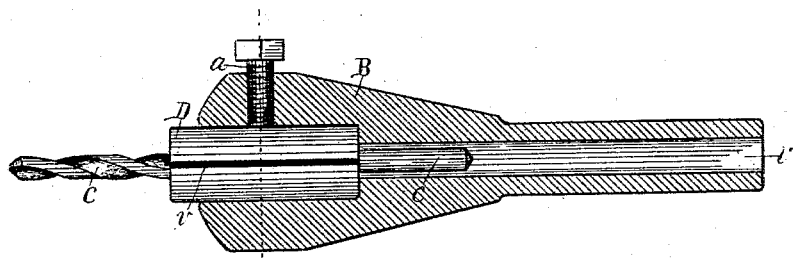
Figure 3:
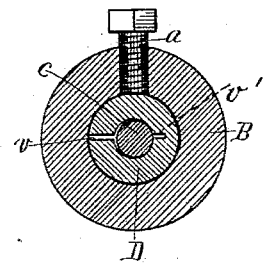

Figure 1 is a perspective view; Fig. 2, a longitudinal section; Fig. 3, a cross section.

In the drawings forming a part of this specification, and in which like letters refer to like parts, D represents a cylinder or sleeve of any suitable length, open at one side, $v$, and its opposite inside provided with one or more longitudinal channels, $v'$, cut partly through its substance for the purpose of giving the requisite degree of elasticity to the sleeve to allow the drill to readily enter and to allow it at the same time to grasp the drill when outside pressure is applied, as will presently more clearly appear.

The detachable outside spindle, B, has a bore, $r$, extending its entire length, to receive the sleeve D and drill C to any desired depth or to receive the drill directly without the aid of the sleeve D. The drill C is held in place by a set-screw or other device directly or indirectly applied.

The sleeve D may be adapted for use in any of the drilling devices hitherto employed, where the drill is held to its work by pressure applied directly on the drill-shank by means of the ordinary set-screw; or any of the well-known central drill-chucks may be employed instead. The alteration necessary, consisting in the substitution of a hollow spindle of suitable diameter and depth to receive the herein-described sleeve and drills to be used, is obvious.

In using this new invention the operator has only to relieve the drill C of the pressure applied thereto through the sleeve D by means of the set-screw A (or equivalent device) to enable him to instantly regulate the length of the exposed portion of the drill at will, thus adapting the device to perform most perfectly and expeditiously all kinds and conditions of work at a great saving of time and drills.

I have herein described the method which I prefer; but I do not confine myself to that or any particular form. This may be varied greatly, as by the use of a cylinder in several parts hinged together or otherwise, thus forming a supporting-sleeve.

Having thus fully described my invention, and pointed out its mode of operation, what I claim, and desire to secure by Letters Patent of the United States, is—

1. As a new article of manufacture, a drill-sleeve, D, constructed with the longitudinal opening $v$ and channel $v'$, substantially as and for the purpose set forth.

2. The combination of a side-open and channeled sleeve, a chambered drill-spindle, and a clamp-screw, substantially as and for the purpose specified.

IRA V. HICKS.

Witnesses:
JOHN P. OGGEL,
D. H. HAINES.